Nov. 15, 1932.  B. STECHBART  1,887,664
MOTION PICTURE PROJECTING MACHINE AND CONTINUOUS FILM FEED REEL THEREFOR
Filed May 16, 1928    3 Sheets-Sheet 2
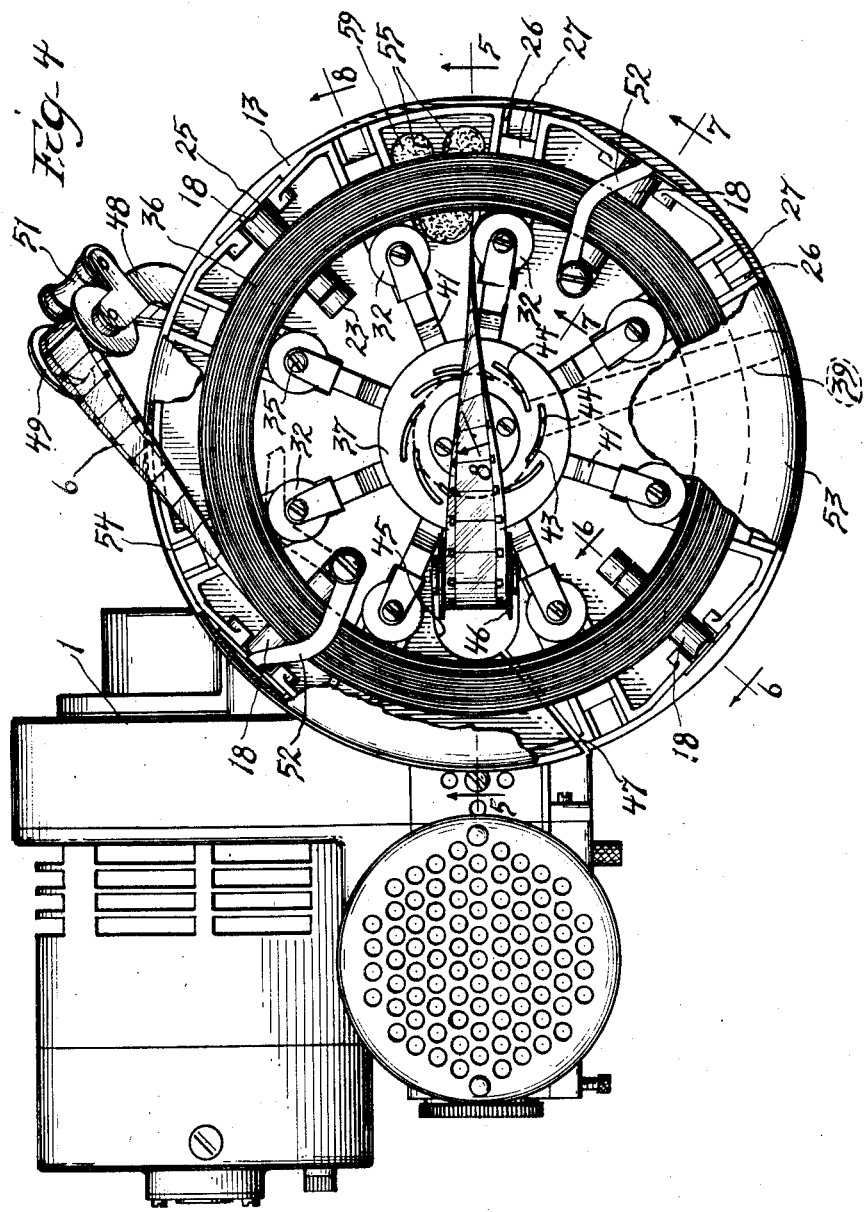
Inventor:-
Bruno Stechbart
By:- Muhle & Miehle
Atty's Nov. 15, 1932.  B. STECHBART  1,887,664
MOTION PICTURE PROJECTING MACHINE AND CONTINUOUS FILM FEED REEL THEREFOR
Filed May 16, 1928  3 Sheets-Sheet 3
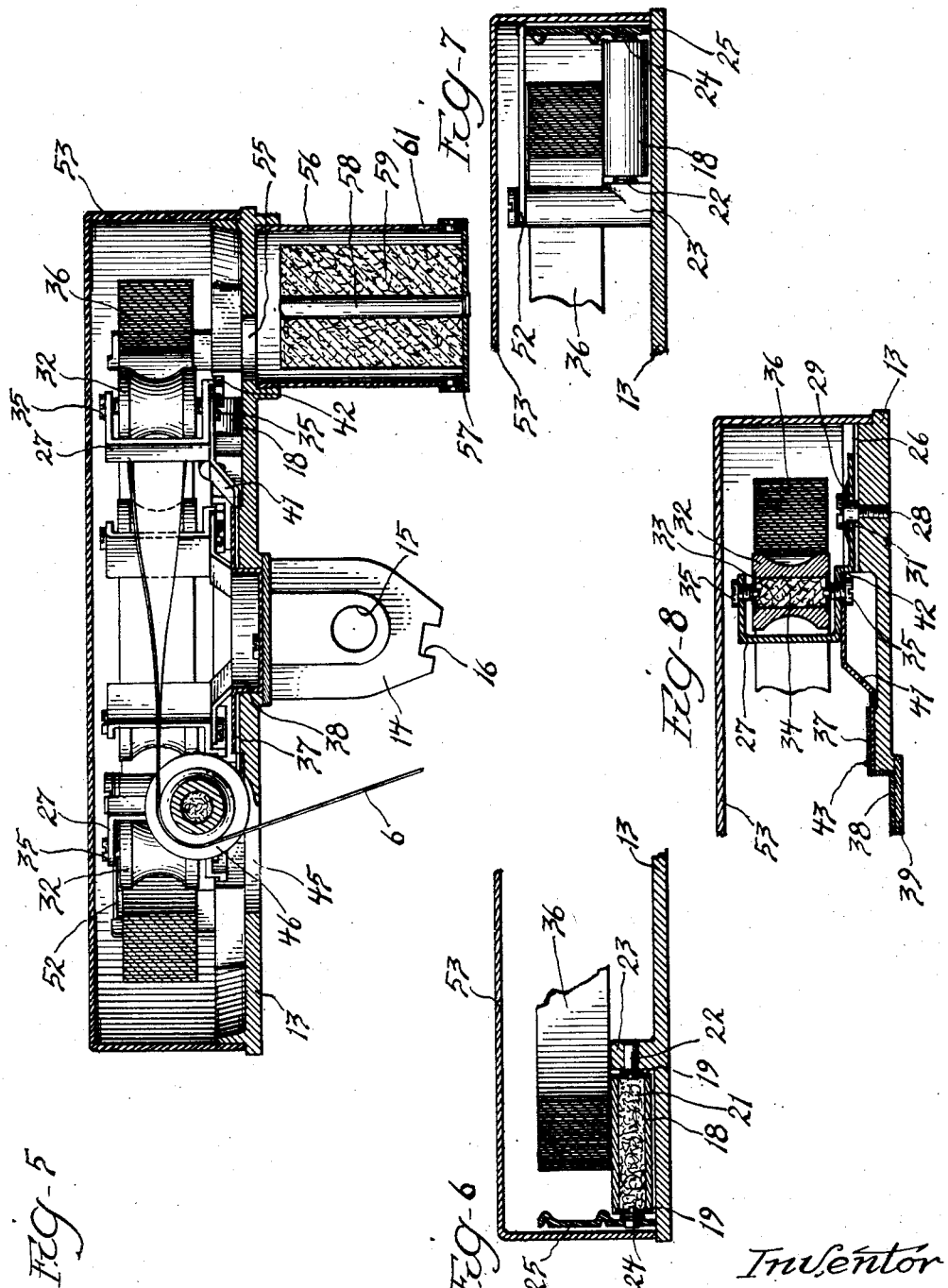
Inventor
Bruno Stechbart
By:- Miehle & Miehle,
Atty's.

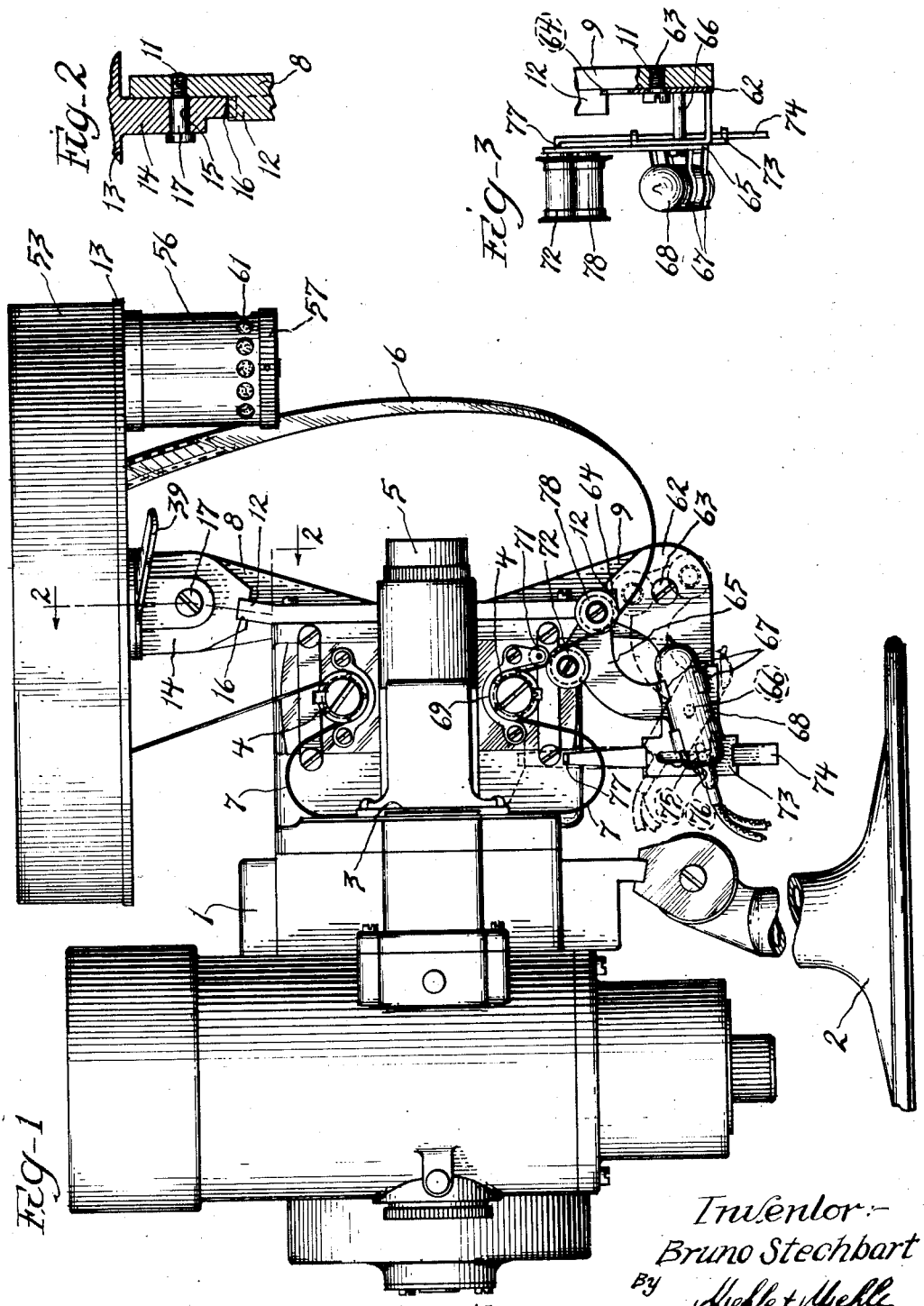

UNITED STATES PATENT OFFICE

BRUNO STECHBART, OF CHICAGO, ILLINOIS, ASSIGNOR TO THE BELL & HOWELL COMPANY, OF CHICAGO, ILLINOIS, A CORPORATION OF ILLINOIS

MOTION PICTURE PROJECTING MACHINE AND CONTINUOUS FILM FEED REEL THEREFOR

Application filed May 16, 1928. Serial No. 278,134.

My invention relates particularly to motion picture projecting machines which project from an endless film strip, although certain features thereof are not limited to this use alone.

Certain objects of my invention reside in the provision of a motion picture projecting machine which is well adapted to project continuously from an endless film strip, which is compact, which is convenient in use and permits of easy and convenient mounting of the film, which involves a relatively small wear on the film, and which is adapted to the structure of a certain motion picture projecting machine of the usual type with a view particularly toward the conversion of the same for such continuous projection.

Other objects of the invention reside in the provision of a continuous strip feed reel which is well adapted for its purpose, which is compact, which is convenient particularly in the mounting of an endless strip thereon, which involves a relatively small amount of wear on the strip, which is adapted, particularly as an attachment, for a motion picture projecting machine of a certain design, which is conveniently adjustable, and which provides for the humidification of a film strip mounted thereon.

Further objects of the invention reside in the provision of automatic control means for stopping operation of the projecting machine or the film feeding mechanism thereof upon the occurrence of an abnormal condition of the film fed thereby whereby operation of the film feeding mechanism is stopped in the event of such occurrences as breakage of the film or abnormal decrease of the length of that portion of the film forming a compensating loop between the intermittent film feed guide and a constant film feed sprocket of the machine.

The invention will be better understood by reference to the accompanying drawings forming a part hereof, in which—

Figure 1 is a side elevation of a motion picture projecting machine embodying my invention;

Figure 2 is a partial section on the line 2—2 of Figure 1;

Figure 3 is a front elevation of a portion of the machine with parts broken away and in section;

Figure 4 is a top plan view of the machine with a part broken away;

Figure 5 is a section of the continuous strip feed reel of my invention on the line 5—5 of Figure 4;

Figure 6 is a partial section on the line 6—6 of Figure 4;

Figure 7 is a partial section on the line 7—7 of Figure 4; and

Figure 8 is a partial section on the line 8—8 of Figure 4.

Like characters of reference indicate like parts in the several views.

Referring to the drawings, 1 designates generally a motion picture projecting machine frame which is supported for angular adjustment on a transverse axis upon a base 2. The frame 1 carries suitable projecting mechanism and devices which are inclusive of an exposure apertured intermittent film feed guide 3, two vertically spaced constant feed sprockets 4 disposed on horizontal transverse axes and associated with respective ends of the guide 3, and a horizontally disposed forwardly and rearwardly extending projecting lens 5 disposed between the sprockets 4 and in front of the guide 3 and registered with the exposure aperture of the guide. See Figure 1.

In operation a perforated film 6 is fed by means of the sprockets 4 to and from the ends of the guide 3 through compensating loops 7, and in the guide the film is intermittently fed by a suitable intermittent feed mechanism, a shutter operating in timed relation with the intermittent feed mechanism cutting off the projection light at the exposure aperture of the guide during the periodic movement of the film therein.

The frame 1 is provided with upwardly and downwardly projecting extensions 8 and 9 at its front end adjacent the sprockets 4, and these extensions are provided with transverse threaded bores 11 therethrough and lugs 12 radially spaced from said bores and disposed inwardly thereof. See Figures 1, 2 and 3.

The motion picture projecting machine above referred to is similar to that described and claimed in U. S. Letters Patent, No. 1,587,955, issued June 8, 1926, on application of Albert S. Howell, the extensions 8 and 9 being shown therein as forming supports for reel mount arms which are mounted on these extensions for angular adjustment or folding by means utilizing the threaded bores 11 and the lugs 12.

In accordance with my purpose of providing for the conversion of the machine shown in the aforementioned Letters Patent for continuous projection, I utilize the upper extension 8 with its bore 11 and lug 12 for the detachable support thereon of the continuous film feed reel of my invention which will now be described.

A frame plate 13 of circular form is provided with a support bracket formation 14 disposed intermediately thereof and extending outwardly from a face thereof and provided with a transverse bore 15 therethrough and a transverse end slot 16 at the outer end thereof. See Figures 1, 2 and 3. The frame plate is detachably secured with the frame 1 by means of a headed screw 17 passing through the bore 15 of the bracket formation 14 and screw-threaded into the bore 11 of the upper extension 8, the transverse end slot 16 of the bracket formation engaging the lug 12 of the upper extension 8 to positively position the frame plate angularly on the axis of the screw 17. See Figures 1 and 2.

As so secured on the frame 1 the frame plate 13 is disposed in a horizontal plane above the sprockets 4, and carried on the upper face of this frame plate, that is the face thereof opposite that from which the bracket formation 14 extends, is a constant feed reel drum which is disposed in a plane corresponding with that of the frame plate. See Figures 4 and 5 to 8 inclusive.

A plurality of horizontal rollers are arranged radially about the axis of the plate 13, and these rollers are axially bored, see Figure 6, and have circular axially bored plates 19 secured at the ends thereof in shouldered end portions of said bores, and have lubricant saturated wicks 21 disposed in the bores thereof between the plates.

The inner ends of the rollers 18 are rotatably mounted by means of studs 22 mounted in bosses 23 on the plate 13 and engaging in the bores of the plates 19 at the inner ends of the rollers. The outer ends of the rollers 18 are rotatably mounted by means of studs 24 mounted in vertical plates 25, secured on the plate 13 and extending upwardly therefrom, and engaging in the bores of the plates 19 at the outer ends of the rollers.

Formed on the upper face of the frame plate 13 are a plurality of slides 26 which are arranged radially about the axis of this plate, see Figures 4 and 8, and generally U-shaped supports 27 have legs thereof elongated and retained in said slides for movement therealong by means of headed screws 28 first passing through spring washers 29 and then through slots 31 through the supports 27 and extending along the slides and finally screw-threaded into the plate 13, whereby the supports 27 are adjustable radially of the axis of the plate 13.

The U-shaped supports 27 are disposed in vertical planes and face outwardly of the axis of the plate 13, and vertically disposed rollers 32 are mounted on these supports between the legs thereof in the following manner. See Figure 8. The rollers 32 are axially bored and have circular axially bored plates 33 secured at the ends thereof in shouldered end portions of said bores, and have lubricant saturated wicks 34 disposed in the bores thereof between the plates. Headed screw studs 35 are screw-threaded through the legs of the supports 27 and have reduced inner end portions thereof engaged in the bores of the plates 33 for the rotatable mounting of the rollers 32.

Thus is formed a constant strip feed drum for carrying a coil 36 of the film 6 which is endless, the coil resting upon the horizontal rollers 18 and encircling the vertical rollers 32 whereby the coil is supported for rotation. The rollers 32 are mounted for radial adjustment in order that the size of the coil may be adjusted to conveniently effect the proper length of the loop of film between the interior and exterior thereof and these rollers are conveniently adjusted simultaneously in the following manner.

The plate 13 is provided with an axial bore therethrough, and a circular plate 37 overlying the plate 13 has an axial downward projection 38 journaled in this bore for angular movement of the plate 37 on the axis of the plate 13 and the feed drum. See Figures 4 and 5. A handle 39, disposed below the plate 13, is secured upwardly against the projection 38 and provides for the manual adjustment of the plate 37 from below the plate 13. See Figures 1, 4 and 5.

Connecting links 41 are secured with the supports 27 by means of the lower screw studs 35 and shoulders formed by intermediate offsets 42 on the lower legs of the supports 27, and extend inwardly therefrom and have their inner ends underlying the plate 37. See Figures 4, 5 and 8. The inner ends of the links 41 are turned upwardly, as designated at 43, and are engaged in spiral cams slots 44 through the plate 37 and spaced about the axis thereof, whereby angular adjustment of the plate 37 effects simultaneous adjustment of the rollers 32.

The frame plate 13 is provided with an intermediate film passage opening 45 therethrough disposed between two of the drum rollers 32 and communicating with the interior of the feed drum and the film coil 36 thereon. See Figures 4 and 5. A revoluble flanged guide roller 46 is mounted on the plate 13 and is disposed on a horizontal axis for guiding the film 6 through the opening 45 and between the upper sprocket 4 and the interior of the drum, the film making a one quarter turn twist between the roller 46 and one of the rollers 32.

The frame plate 13 is provided with a slot 47 extending from the edge thereof to the opening 45 for the insertion and removal of the film. See Figure 4.

Mounted on the frame plate 13 is a bracket 48, and revolubly mounted on this bracket and disposed on the exterior of the plate 13 and the coil 36 on the feed drum is a flanged guide roller 49 and a second guide roller 51 disposed in adjacent parallelism with the roller 49 for retaining a film thereon. The rollers 49 and 51 are disposed obliquely to the planes of the plate 13, the feed drum and the coil 36 thereon for guiding the film 6 from the lower sprocket 4 to the exterior of the coil 36 on the feed drum. See Figures 1 and 4.

In operation the upper feed sprocket 4 of the projecting machine draws the film 6 from the interior of the coil 36 and thereby rotates the coil 36, which in turn rewinds the film on the exterior thereof as it is fed from the lower sprocket 4, the guide rollers 46, 49 and 51 serving to properly guide the film between the sprockets 4 and the coil 36, the arrangement providing for the advantageous travel of the film between the sprockets and the coil.

The plates 25 extend upwardly from the plate 13 to prevent movement of the film beyond the outer ends of the rollers 18, and arms 52 are pivotally mounted on vertical axes at the upper ends of two upwardly extended bosses 23 for movement into position over the coil 36 on the feed drum to retain the same thereon and for movement out of overlying relation with the coil, as shown in broken lines in Figure 4, for the mounting and removal of the coil. See Figures 4 and 7.

A circular inverted cup shaped closure member 53 is removably mounted on the plate 13 and forms therewith an enclosure about the feed drum and coil 36 thereon, and is provided with an opening 54 in its peripheral wall for the passage of the film 6 between the exterior of the coil 36 and the guide roller 49. See Figures 1, 4 and 5.

The frame plate 13 is provided with several adjacent openings 55 therethrough communicating with the exterior of the enclosure formed by this plate and the closure member 53. See Figures 1, 4 and 5. A cylindrical casing member 56 has one end thereof secured to the under or outer face of the plate 13 and surrounds the openings 55. A cap 57 is detachably secured in a usual manner at and closing the other end of the member 56. An axial stud 58 is secured on the cap 57 and extends within the member 56, and absorbent material 59, having a bore therein and engaged by means of said bore on the stud, is disposed within the casing for removal therefrom with the cap 57. The casing member 56 is provided with vent holes 61 adjacent its lower end, and the absorbent material 59 is adapted to be saturated with water so that the coil 36 enclosed within the enclosure formed by the plate 13 and the closure member 53 is kept from becoming too dry.

Means, under the control of the film 6 fed by the feeding means, is provided for stopping operation of the machine including the feeding means with the occurrence of an abnormal condition of the film and will now be described. See Figures 1 and 3.

A bracket 62 is detachably secured on the lower extension 9 of the frame 1 by means of a headed screw 63 passing through an aperture thereof and screwthreaded into the threaded bore 11 of this extension, the lug 12 of this extension engaging a slot 64 in this bracket to position the same angularly of the axis of this screw.

An arm 65 is pivotally mounted on a stud 66 disposed parallel to the sprockets 4, and is provided with clips 67 in which is held a tilting mercury electric switch 68 of usual construction which is connected in the electric circuit of the projecting machine in a manner unnecessary to be described to permit operation of the machine when in closed circuit position and to stop operation thereof including the film feeding means when in open circuit position, angular movement of the arm 65 effecting movement of the switch into its open and closed circuit positions.

A film retaining structure 69 associated with the lower sprocket 4 is extended downwardly in front of this sprocket, and a revoluble roller 71, disposed in parallelism with this sprocket, is mounted on the extended portion of the retaining structure 69 and is engageable with the film fed by this sprocket. See Figure 1. A revoluble roller 72, disposed in parallelism with the lower sprocket 4, is mounted on an upwardly and forwardly disposed portion of the arm 65 for movement therewith past but immediately adjacent the roller 71.

The arm 65 is yieldably urged by gravity in a clockwise direction in Figure 1, and is maintained against such movement and in the position shown in Figure 1 by the film 6, fed from the lower sprocket 4, interposed between the rollers 71 and 72. In this position of the arm 65 the switch 68 is in closed circuit position to permit operation of the projecting machine.

When the film fails to be interposed between the rollers 71 and 72, as when it is broken, the arm 65 moves under the influence of gravity to the position shown in broken lines in Figure 1, in which position the switch 68 is in open circuit position to stop operation of the machine and the film feeding mechanism.

The bracket 62 is provided at its rear with a vertical slide 73 disposed under the lower loop 7 of the film 6, and mounted for vertical movement in this slide is a slide member 74 which is operatively connected with the arm 65 to the rear of the pivotal axis thereof by means of a stud 75 mounted on the member 74 and engaging in a radially disposed slot 76 through the arm 65. See Figures 1 and 2.

Accordingly when the arm 65 is in normal position to permit operation of the machine as shown in Figure 1, the member 74 is disposed in a lower position, and when the arm 65 is in its other position to stop operation of the machine, the member 74 is in an upper position as shown in broken lines in Figure 1.

The member 74 passes upwardly at the inside of the lower loop 7 of the film, and the upper end of the member 74 is turned outwardly, as designated at 77, and lies within the normal lower loop 7 of the film. Normally the portion 77 is not engaged with the lower loop 7 of the fed film, but when the portion of the film forming the lower loop 7 is abnormally decreased in length, as by reason of the intermittent feeding mechanism missing periodic feeding of the film in the guide 3, due to such conditions as torn or mutilated perforations in the film, while the lower sprocket 4 continues to feed the film, this portion of the film engages the portion 77 of the member 74 and moves the same upwardly to its upper position, as shown in broken lines in Figure 1.

This movement of the member 74, acting through the stud 75 and slot 76 moves the arm 65 from its normal position aforesaid, and, forcing the roller 72 past the roller 71 with the film therebetween, causes movement of the arm 65 into the position thereof in which the switch 68 is opened to stop operation of the machine and the feeding mechanism thereof.

Another revoluble roller 78 is mounted on the arm 65 adjacent to and in parallelism with the roller 72 to guide the film from the roller 72 and to slightly stiffen the film at the rollers 71 and 72.

While I have described and shown the preferred embodiment of my invention I do not wish to be limited to the precise details of construction shown as changes may readily be made without departing from the spirit of my invention, but having thus described my invention, I claim as new and desire to secure by Letters Patent the following:

I claim:

1. In a continuous strip feed reel the combination with a frame plate member of generally circular form, of a continuous strip feed reel drum carried on one face thereof in a plane corresponding thereto, a support bracket formation on said plate member and disposed intermediately thereof and extending outwardly from the other face thereof and provided with a transverse bore therethrough and transverse end slot at the outer end thereof, said frame plate member being provided with an intermediate strip passage opening therethrough communicating with the interior of said drum and being provided with a strip insertion and removal slot therethrough extending from the edge thereof to said opening, a guide-roller carried by said frame plate on an axis corresponding with the plane thereof and disposed adjacent said opening for guiding a strip through and between said opening and the interior of a coil of the strip on said drum, a pair of parallel guide rollers carried by said plate member and disposed on the exterior of said coil and disposed obliquely to the plane of said plate for guiding the strip at the exterior of said coil, and a removable circular cup shaped closure member forming with said plate member an enclosure about said drum and being provided with a strip passage opening through the peripheral wall thereof for the passage of the strip therethrough between said second mentioned guide roller and the exterior of said coil.

2. In a continuous feed reel the combination with a frame plate member, of a continuous strip feed reel drum carried by and disposed at one side of said plate member in a plane corresponding and adjacent thereto, said plate member being provided with an intermediate opening therethrough providing communication with the interior of the reel drum for the passage of a strip and provided with a slot therethrough extending from the edge thereof to said opening for the insertion and removal of the strip, and a guide roller disposed adjacent said opening on an axis corresponding with the plane of said drum for guiding the strip between said opening and the interior of a coil of the strip on said drum.

3. In a continuous strip feed reel the combination with a continuous strip feed drum, of an enclosure structure thereabout adapted for the passage of a strip into and out of the enclosure thereof and including a frame plate provided with an opening therethrough communicating with said enclosure, a cylindrical member having one end thereof secured to the outer face of said frame plate and surrounding said opening and provided with vent holes, a cap detachably secured to said cylindrical member at and closing the other end thereof, an axial stud secured on said cap and extending within said cylinder, and absorbent material having a bore therein and engaged by means of said bore on said stud within said cylindrical member for removal therefrom with said cap.

4. In a motion picture projecting machine the combination with a main frame and a film feeding mechanism thereon including two vertically spaced constant feed sprockets disposed on horizontal axes and of an extension on said main frame projecting upwardly therefrom, of a frame plate of generally circular form, a support bracket formation on said plate and detachably secured on said extension and adapted thereby to support said plate member in a horizontal plane above said sprockets and extension, a continuous film feed reel drum on said plate member above the same and disposed in a corresponding plane, said plate member having an intermediate opening therethrough communicating with the interior of said drum and having a film insertion and removal slot extending from the edge thereof to said opening, a guide roller carried by the plate member and disposed adjacent said opening on an axis corresponding with the axes of said sprockets for guiding a film through said opening and between the upper of said sprockets and the interior of a coil of the film on said drum, a pair of guide rollers carried with said plate member adjacent the exterior of said coil and disposed obliquely to the plane of said drum for guiding the film between the lower of said sprockets and the exterior of said coil, and a circular inverted cup shaped closure member removably mounted on said plate member and forming with said plate member an enclosure about said drum and coil and provided with an opening in the peripheral wall thereof for the passage of the film between said pair of rollers and the exterior of said coil.

In witness whereof I hereunto affix my signature this twelfth day of May, 1928.

BRUNO STECHBART.